United States Patent
Mandyam

(10) Patent No.: US 7,680,208 B2
(45) Date of Patent: Mar. 16, 2010

(54) MULTISCALE WIRELESS COMMUNICATION

(75) Inventor: Giridhar D. Mandyam, Plano, TX (US)

(73) Assignee: Nokia Corporation, Espoo (FI)

( * ) Notice: Subject to any disclaimer, the term of this patent is extended or adjusted under 35 U.S.C. 154(b) by 1388 days.

(21) Appl. No.: 10/788,188

(22) Filed: Feb. 25, 2004

(65) Prior Publication Data

US 2005/0185732 A1    Aug. 25, 2005

(51) Int. Cl.
*H04L 27/00* (2006.01)
(52) U.S. Cl. .................... 375/295; 375/259
(58) Field of Classification Search ........... 375/295, 375/259
See application file for complete search history.

(56) References Cited

U.S. PATENT DOCUMENTS

| | | | | |
|---|---|---|---|---|
| 5,781,881 A * | 7/1998 | Stegmann | ................ | 704/211 |
| 5,822,370 A * | 10/1998 | Graupe | ................ | 375/240 |
| 6,278,753 B1 * | 8/2001 | Suarez et al. | ................ | 375/350 |
| 6,456,657 B1 | 9/2002 | Yeap et al. | ................ | 375/240.12 |
| 6,542,836 B1 * | 4/2003 | Sasaki et al. | ................ | 702/66 |
| 6,675,140 B1 * | 1/2004 | Irino et al. | ................ | 704/203 |
| 6,885,993 B2 * | 4/2005 | Wu et al. | ................ | 704/500 |
| 6,912,372 B2 * | 6/2005 | McCorkle et al. | ................ | 455/39 |
| 6,961,742 B2 * | 11/2005 | Neretti et al. | ................ | 708/300 |
| 7,023,324 B2 | 4/2006 | Kodama et al. | ................ | 340/310.02 |
| 7,058,140 B2 * | 6/2006 | Smart et al. | ................ | 375/316 |
| 7,158,473 B2 | 1/2007 | Kurobe et al. | ................ | 370/204 |
| 7,158,569 B1 * | 1/2007 | Penner | ................ | 375/240 |
| 7,564,800 B2 | 7/2009 | Chini et al. | ................ | 370/252 |
| 2002/0116199 A1 * | 8/2002 | Wu et al. | ................ | 704/500 |
| 2002/0191533 A1 | 12/2002 | Chini et al. | ................ | 370/206 |
| 2004/0114772 A1 * | 6/2004 | Zlotnick | ................ | 381/92 |
| 2004/0218695 A1 * | 11/2004 | Koga et al. | ................ | 375/326 |
| 2004/0228273 A1 | 11/2004 | Kurobe et al. | ................ | 370/229 |
| 2005/0047513 A1 * | 3/2005 | Vitenberg | ................ | 375/260 |
| 2006/0203897 A1 | 9/2006 | Kodama et al. | ................ | 375/219 |
| 2006/0227699 A1 | 10/2006 | Chini et al. | ................ | 370/208 |
| 2007/0211786 A1 * | 9/2007 | Shattil | ................ | 375/141 |

(Continued)

FOREIGN PATENT DOCUMENTS

JP    2003/218831 T    7/2003

(Continued)

OTHER PUBLICATIONS

Zou Hehong et al., "Design and Parametrization of M-band Orthonormal Wavelets", IEEE International Symposium on Circuits and Systems, San Diego, USA, May 1992, pp. 983-986.*

(Continued)

*Primary Examiner*—Jean B Corrielus
(74) *Attorney, Agent, or Firm*—Harrington & Smith

(57) ABSTRACT

Disclosed is a method and an apparatus that use wavelet transforms for information to be transmitted to a wireless channel. The method includes determining a wavelet transform using at least a parameter set, the parameter set configured to select one of a plurality of wavelets; modulating an input signal into a modulated output signal using the wavelet transform, wherein the modulated output signal is suitable for transmission over a channel; and responsive to information received from a feedback path, modifying at least a portion of the parameter set based at least in part on the received information.

18 Claims, 12 Drawing Sheets

U.S. PATENT DOCUMENTS

2009/0135932 A1    5/2009    Kodama et al. ............ 375/260

FOREIGN PATENT DOCUMENTS

| JP | 2006/526370 T | 11/2006 |
|---|---|---|
| WO | WO-02/102130 A2 | 12/2002 |
| WO | WO-03/063380 A3 | 7/2003 |
| WO | WO-2004/102915 A1 | 11/2004 |

OTHER PUBLICATIONS

Newlin Heather M., "Developments in the Use of Wavelets In Communication Systems", IEEE Military Communications Conference Proceedings, Oct. 18-21, 1998, vol. 1., p. 343-349.

Schneid et al., "On the Parametrization of the Coefficients of Dilation Equations for Compactly Supported Wavelets", Computing 51, 165-173.

Lindsey A. R. et al., Wavelet Packet Modulation: A Generalized Method for Orthogonally Multiplexed Communications Proceedings of the Twenty-Seventh Southeastern Symposium on Starkville, MS, USA Mar. 12-14, 1995.

Rieder Peter, "Parametrization of Symmetric Multiwavelets", 1997 IEEE International Conference on Munich, Germany Apr. 21-24, 1997.

Nguyen Thong et al., "Wavelets and Wavelets-Design Issues", Singapore ICCS'94, Section II, III, p. 188-194.

Zhao Wei et al., "Discrete-Time Continuous-Dilation Wavelet", Proceedings of IEEE-SP International Symposium of Pittsburgh, PA, USA, Oct. 6-9, 1998, p. 233-236.

Vetterli, Martin and Jelena Kovacevic, "Wavelets and Suband Coding", Englewood Cliffs, NJ: Prentice-Hall Inc., 1995.

Zou, Hehong and Ahmed H. Tewfik, Parameterization of Compactly Supported Orthonormal Wavelets, IEEE Transactions on Signal Processing, vol. 41, No. 3, Mar. 1993, pp. 1428-1431.

Silva, Vitor and Luis de Sa, "Analytical Optimization of CQF Filter Banks", IEEE Transactions on Signal Processing, vol. 44, No. 6, Jun. 1996, pp. 1564-1568.

Wornell, Gregory W. "Emerging Applications of Multirate Signal Processing and Wavelets in Digital Communications", Proceedings of the IEEE< vol. 84, No. 4, Apr. 1996, pp. 586-603.

Linsey, Alan R. "Wavelet Packet Modulation for Orthogonally Multiplexed Communication", IEEE Transactions on Signal Processing, vol. 45, May 1997, pp. 1336-1339.

Wong, K.-M., Wu, Jr., Davidson, T.N. and Jin, Q., "Wavelet Packet Division Multiplexing and Wavelet Packet Design under Timing Error Effects", IEEE Transactions on Signal Processing, vol. 45, No. 12, Dec. 1997, pp. 2877-2890.

Strang, Gilbert and Truong Nguyen, "Wavelets and Filter Banks", Wellesley, MA; Wellesley-Cambridge Press, 1996.

Beth, Thomas et al., "Construction of Algebraic Wavelet Coefficients", Institut for Algorithmen und Kognitive Systeme, 4 pages, 1995.

Vidakovic, Brani, "Pollen Bases and Daubechies-Lagarias Algorithm in MATLAB", Jackets' Wavelets website, http://isye,gatech.edu/~brani/datasoft/DL.pdf 2002.

Thong Nguyen and Dadang Gunawan, Wavelets—Design Issues, Singapore ICCs/1994, Section II, III p. 188-194.

Jorgensen Paul, "Choosing Discrete Orthogonal Wavelets for Signal Analysis and Approximation"<,Proceedings of International Conference on Acoustics, Speech and Signal, 1993 pp. III-308-III-311.

* cited by examiner

MULTISCALE WIRELESS COMMUNICATION

FIELD OF THE INVENTION

The field of the invention is that of wireless communications, in particular that of wavepacket systems that employ separation in both the time and frequency domains.

BACKGROUND OF THE INVENTION

Wireless communications involves several forms of signal modulation prior to transmission through a mobile channel. Some examples of the type of processing involved in wireless modulation include temporal processing (e.g. spread spectrum), spectral processing (e.g. orthogonal frequency division multiplexing, i.e. OFDM) and spatial processing (e.g. space-time coding). This kind of processing occurs over a single dimension (e.g. time, frequency, or spatial), and is sometimes referred to as single-scale modulation. Usually the type of processing involved is oftentimes selected based on the type of mobile channel conditions experienced. For instance, a mobile channel that provides no diversity (e.g. single-path fading) is sometimes addressed using spatial processing. On the other hand, a mobile channel where multipath is experienced (e.g. frequency-selective fading) may be better handled using spectral modulation such as OFDM.

Multiscale modulation involves processing the signal over two dimensions, namely time and frequency. Therefore, the output of a multiscale modulator is indexed by both a temporal range and frequency bin. This type of signal conditioning has the potential to match to two dimensions of the wireless channel rather than one.

Multiscale modulation can be visualized using a time-frequency tiling diagram. A sample tiling, derived from (1), is depicted in FIG. 1. The time-frequency tiling of a waveform composed of a sinusoid at frequency $f_0$ and impulse $t_0$ in this example results in energy in all subbands in the time-frequency domain intersecting both $f_0$ and $t_0$. A time-frequency representation of a signal can be obtained using a wavelet decomposition.

Previous work has addressed the use of the wavelet decomposition in digital communications. For instance, Wornell (8) has developed the concept of fractal modulation for multi-scale communication. Moreover, in works such as (9) and (10), an optimal wavelet decomposition is chosen to account for specific types of channel conditions or transmitter imperfections. A particular problem with much previous work in the area of multiscale communications is that the issue of equalization of multipath channels at the receiver is oftentimes not specifically addressed. This is most likely due to the difficulty in trying to adaptively equalize the channel in two dimensions. Thus it would be desirable to be able to match a particular wavelet to instantaneous channel conditions with a minimal amount of interaction (i.e. feedback) between the receiver and transmitter. However, previous work has not addressed taking advantage of compact realizations of large wavelet families so as to match a wavelet with wireless channel conditions based on the selection of one or more scalar values. In this work, based on well-known compact wavelet decompositions, a parameterized wavelet modulation method is developed in which parameters are chosen to best match the wireless channel conditions.

Wavelet decompositions are normally defined in the continuous domain, where the so-called scaling function $\phi(x)$ is first derived (2), (3), $$\phi(x)=\Sigma c_k \phi(2x-k) \tag{1}$$

where $\{c_k\}$ is a real sequence. The sequence $\{c_k\}$ is of even length and must satisfy the following:

$$\Sigma c_k = 2$$

$$\Sigma c_k c_{k+2m} = 2\delta(m) \tag{2}$$

Another important characteristic of wavelets which determines the "smoothness", or continuity of the sequence defined by $\{c_k\}$ is the number of vanishing moments. If the wavelet has M ($M \geq 1$) vanishing moments, then the following holds:

$$\Sigma (-1)^k k^m c_k = 0,\ m=0,1(M-1) \tag{3}$$

A corresponding wavelet can now be defined as $$\psi(x)=\Sigma d_k \psi(2x-k) \tag{4}$$

where $$d_k=(-1)^k c_{1-k} \tag{5}$$

Thus the dilates and translations of the wavelet function form an orthonormal basis:

$$\{\sqrt{2^j}\psi(2^j x - k)\} \tag{6}$$

Since the wavelet has compact support, the sequence $\{c_k\}$ is of finite length, assume that the sequence length is 2 N. Then the discrete wavelet transform may be defined starting with the two equal length sequences $\{c_k\}$ and $\{d_k\}$. These two sequences can also be thought of as filters; they collectively form a perfect reconstruction filter bank.

A parameterized construction for wavelet and scaling filters for arbitrary values of N with $M \leq N$ vanishing moments was proposed in references (3) and (4). Let us assume that for a value of N, the filter coefficients are now denoted as $\{c_k^N\}$. Given an N-length wavelet parameter set $\{\alpha_i\}(-\pi \leq \alpha_i < \pi, 0 \leq i < N)$, the coefficients $\{c_k^N\}$ are derived by the recursion $$c_0^0 = \frac{1}{\sqrt{2}} \tag{7}$$

$$c_1^0 = \frac{1}{\sqrt{2}}$$

$$c_k^n = \frac{1}{2}[(c_{k-2}^{n-1} + c_k^{n-1})(1 + \cos\alpha_{n-1}) + (c_{2(n+1)-k-1}^{n-1} + c_{2(n+1)-k-3}^{n-1})(-1)^k \sin\alpha_{n-1}]$$

The wavelet construct in (7) is restrictive in the sense that the parameter set cannot in general be defined on the $[-\pi,\pi]^N$ continuum and still yield a wavelet with at least one vanishing moment. Pollen proved however that wavelets can be defined on the continuum $[-\pi,\pi]^N$ for arbitrary N (at the cost of smoothness). To examine these types of constructs for a given N, let us define the filter bank matrix $F_N$ as $$F_N = \begin{bmatrix} c_0 & \cdots & c_{2N-1} \\ d_0 & \cdots & d_{2N-1} \end{bmatrix} \tag{8}$$

Then the filter bank matrix for N=1 is $$F_1 = \frac{1}{\sqrt{2}} \begin{bmatrix} \cos\alpha_0 & -\sin\alpha_0 \\ \sin\alpha_0 & \cos\alpha_0 \end{bmatrix} \tag{9}$$

The matrix in (9) is also sometimes known as the Givens rotation matrix. Similarly, the filter bank matrix for N=2 is (6)

$$F_2 = \frac{1}{\sqrt{8}} \begin{bmatrix} 1-\cos\alpha_0+\sin\alpha_0 & 1+\cos\alpha_0+\sin\alpha_0 & 1+\cos\alpha_0-\sin\alpha_0 & 1-\cos\alpha_0-\sin\alpha_0 \\ 1-\cos\alpha_0-\sin\alpha_0 & -(1+\cos\alpha_0-\sin\alpha_0) & 1+\cos\alpha_0+\sin\alpha_0 & -(1-\cos\alpha_0+\sin\alpha_0) \end{bmatrix} \quad (10)$$

The filter bank expressions for N=2 and N=3 are also sometimes known as Pollen filters, due to the fact that Pollen first proposed these two representations 7). Similarly, the filter bank matrix $F_1$ becomes the Haar matrix when $\alpha_0 = \pi/4$ and $F_2$ is the Daubechies 4-tap filter bank when $\alpha_0 = \pi/6$. Although the filter selectivity improves with increasing N, this comes at the cost of having to determine a larger set of parameters to define the wavelet. This can be seen in the parameterized expression for $\{c_k^3\}$:

$$c_0^3 = \frac{1}{4}[(1+\cos\alpha_0+\sin\alpha_0)(1-\cos\alpha_1-\sin\alpha_1)+2\cos\alpha_0\sin\alpha_1] \quad (11)$$

$$c_1^3 = \frac{1}{4}[(1-\cos\alpha_0+\sin\alpha_0)(1+\cos\alpha_1-\sin\alpha_1)-2\cos\alpha_0\sin\alpha_1]$$

$$c_2^3 = \frac{1}{2}[1+\cos(\alpha_0-\alpha_1)+\sin(\alpha_0-\alpha_1)]$$

$$c_3^3 = \frac{1}{2}[1+\cos(\alpha_0-\alpha_1)-\sin(\alpha_0-\alpha_1)]$$

$$c_4^3 = 1 - c_2^3 - c_0^3$$

$$c_5^3 = 1 - c_3^3 - c_1^3$$

Now two parameters must be determined before specifying the filter bank. In fact, although filter selectivity improves with an increasing number of coefficients, the complexity involved in setting the necessary parameters to form the filter bank also increases.

The wavelet decomposition can now be specified in terms of series of filter banks and resampling stages. Given an input sequence $a_i(n)$, then the output sequence may be derived as per the processing depicted in FIG. 2.

In modern technology, the filter process is performed digitally with a computational system such as a general purpose computer or an integrated circuit adapted for digital signal processing.

The number of resampling stages in a wavelet decomposition is sometimes referred to as the number of dilations. This processing can also be represented as a transformation of the input sequence by a unitary matrix. Assume that the input sequence at time index i, $a_i(n)$ is of (even) length K (i.e. $0 \leq n < K$) and we want to define a discrete wavelet transformation (DWT) matrix $T_K$ of size K by K for a particular filter bank matrix $F_N$. Moreover, assume that there are P dilations desired in the transformation. Then using the cited construction, an iterative method for deriving the transformation matrix may be found. Defining the time scale index as $l (0 \leq l \leq P)$, a K-by-K filter bank matrix can be defined for each time scale:

$$C_l = \begin{bmatrix} F_N & 0_{2\times(K-2N+1)} & & & \\ 0_{2\times2} & F_N & 0_{2\times(K-2N-1)} & & \\ 0_{2\times4} & & F_N & 0_{2\times(K-2N-3)} & \\ \vdots & & & \ddots & \vdots \\ 0_{R\times R} & & & & I_R \end{bmatrix} \begin{matrix} \\ \\ (K-R)\text{rows} \\ \\ \\ \end{matrix} \quad (12)$$

$$R = \begin{cases} 0 & l=0 \\ \sum_{i=1}^{P} \frac{K}{2^i} & l > 0 \end{cases}$$

In (12), $0_{m \times n}$ is the zero matrix of m rows by n columns, and $I_R$ is the identity matrix of R rows by R columns. For each dilation, a permutation matrix $P_\upsilon (1 \leq \upsilon \leq P)$ can be defined as well:

$$P_v = \begin{bmatrix} 1 & 0 & \cdots & 0 & 0 & 0 & 0 & 0 \\ 0 & 0 & 1 & 0 & \cdots & 0 & 0 & 0 \\ 0 & 0 & 0 & 0 & 1 & 0 & \cdots & 0 \\ \vdots & \vdots & & \vdots & & & & \vdots \\ 0 & 1 & 0 & \cdots & 0 & 0 & 0 & 0 \\ 0 & 0 & 0 & 1 & 0 & \cdots & 0 & 0 \\ 0 & 0 & 0 & 0 & 0 & 1 & \cdots & 0 \\ \vdots & \vdots & & \vdots & & & & \vdots \\ 0_{R \times R} & & & & & & & I_R \end{bmatrix} \begin{matrix} \left(\frac{K-R}{2}\right)\text{rows} \\ \\ \\ \left(\frac{K-R}{2}\right)\text{rows} \\ \\ \\ \end{matrix} \quad (13)$$

$$R = \begin{cases} 0 & l=0 \\ \sum_{i=1}^{P} \frac{K}{2^i} & l > 0 \end{cases}$$

Thus, for P dilations, the unitary transform matrix $T_K(P)$ may be determined as $$T_K(P) = C_P P_P \ldots C_1 C_1 C_0 \quad (14)$$

This matrix may now be used to modulate an input vector $a_i = [a_i(0) \ldots a_i(K-1)]^T$ (i being the symbol index). Illustratively, the elements of the input signal vector ai are the coefficients on a set of basis functions that represent the data, e.g. speech.

Thus the output sequence of such a modulation can be formed as the result of a matrix-vector multiplication $x_i = T_K^T(P)a_i$. As described above, the single net matrix $T_K(P)$ represents P inner products of the wavelet with the data. If we assume that $F_N$ results from a compact realization of a wavelet, then we can also assume that $T_K(P)$ is a function of the wavelet parameter set $\{\alpha_i\}$, i.e. $x_i = T_K(P, \{\alpha_i\})a_i$.

Related Art may be found described in the references listed immediately below:

(1) Vetterli, Martin and Jelena Kovacevic. Wavelets and Subband Coding. Englewood Cliffs, N.J.: Prentice-Hall Inc., 1995.

(2) Strang, Gilbert and Truong Nguyen. Wavelets and Filter Banks. Wellesley, Mass.: Wellesley-Cambridge Press, 1996.
(3) Zou, Hehong and Ahmed H. Tewfik. "Parameterization of Compactly Supported Orthonormal Wavelets." IEEE Transactions on Signal Processing. Vol. 41. No. 3. March 1993. pp. 1428-1431.
(4) Schneid, J. and S. Pittner. "On the Parameterization of the Coefficients of Dilation Equations for Compactly Supported Wavelets." Computing. Vol. 51. May 1993. pp. 165-173.
(5) Vidakovic, Brani. "Pollen Bases and Daubechies-Lagarias Algorithm in MATLAB." Jacket's Wavelets website.
(6) Silva, Vitor and Luis de Sa. "Analytical Optimization of COF Filter Banks." IEEE Transactions on Signal Processing. Vol. 44. No. 6. June 1996. pp. 1564-1568.
(7) Pollen, D. "Parameterization of Compactly Supported Wavelets." Aware Inc. technical report AD890503. May 1989.
(8) Wornell, Gregory W. "Emerging Applications of Multirate Signal Processing and Wavelets in Digital Communications." Proceedings of the IEEE. Vol. 84. No. 4. April 1996. pp. 586-603.
(9) Lindsey, Alan R. "Wavelet Packet Modulation for Orthogonally Multiplexed Communication." IEEE Transactions on Signal Processing. Vol. 45. No. 5. May 1997. pp. 1336-1339.
(10) Wong, K. -M., Wu, J., Davidson, T. N. and Jin, Q "Wavelet Packet Division Multiplexing and Wavelet Packet Design under Timing Error Effects." IEEE Transactions on Signal Processing. Vol. 45. No. 12. December 1997. pp. 2877-2890.

SUMMARY OF THE INVENTION

The invention relates to a multi-carrier communications system that adaptively selects a set of wavelets that match channel conditions.

A feature of the invention is the use of a compact parameterization that permits the generation of an infinite number of wavelet and scaling filter pairs using a finite set of parameters such as the number of dilations and the filter parameters.

Another feature of the invention is the elimination of an equalizer in the receiver by altering the parameters of the wavelets to compensate in advance for changing channel conditions.

DETAILED DESCRIPTION

Figure 1:
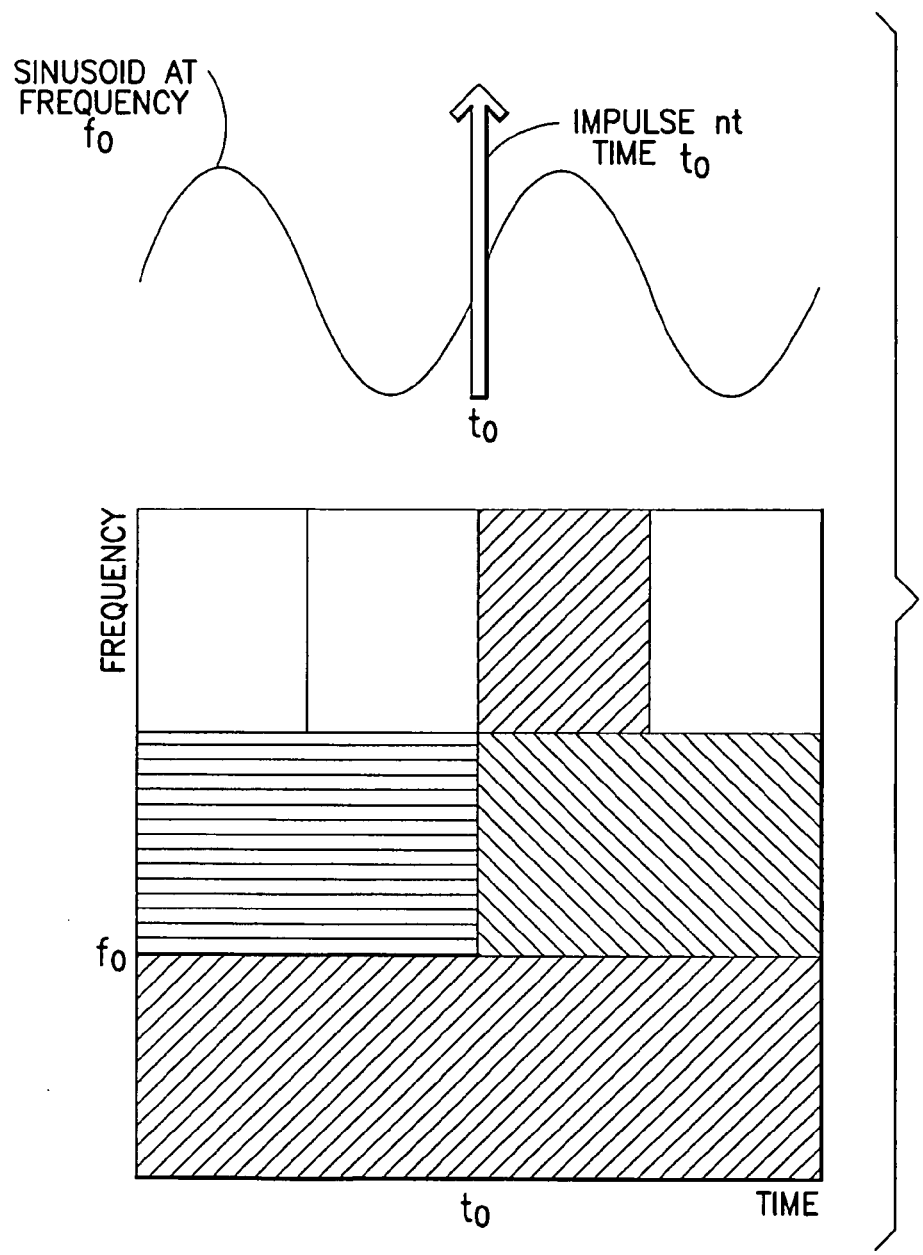
FIG. 1 shows time-frequency relationship in a wave packet system.

A wavelet-based transmission system can be formed starting with an input vector $a_i=[a_i(0)\ldots a_i(K-1)]^T$ and forming an output vector $x_i=T_K^T(P,\{\alpha_i\})a_i$ in a similar fashion to an OFDM system. However, unlike OFDM systems, which can employ simple equalization structures through the use of cyclic convolution properties of the underlying discrete Fourier transform modulation, a wavelet-based system can be sensitive to frequency-selective wireless channels and therefore the equalization problem for wavelets can become complex.

The output vector $x_i$ is transmitted serially. If it is assumed that the wireless channel can be described by an L-tap channel vector $h_i=[h_i(0)\ldots h_i(L-1)]^T$ ($h_i$ is assumed to have unit norm), then the elements of the received signal $y_i$ may be represented as (assuming L<K)

$$y_i(k) = \sum_{m=0}^{k} h_i(m)x_i(k-m) + \sum_{m=k+1}^{L-1} h_i(m)x_{i-1}(K+k-m) + \quad (15)$$
$$n_i(k),\ 0 \le k \le L-1$$
$$= \sum_{m=0}^{L-1} h_i(m)x_i(k-m) + n_i(k),\ L \le k < K-1$$

In (15), $n_i(k)$ is an additive noise term. The typical equalization techniques for this type of received signal are decision-aided, requiring an estimate of the previous transmitted symbol $a_{i-1}$ to account for intersymbol interference (ISI) and estimates of the individual entries of $x_i$ to account for intercarrier interference (ICI). This expression can also be expressed in matrix-vector format:

$$y_i = H_i x_i + H_{ISI\_i} x_{i-1} + n_i \quad (16)$$

In (16), $H_i$, $H_{ISI\_i}$, and $n_i$ are described as below:

$$H_i = \begin{bmatrix} h_0 & 0 & \ldots & 0 & 0 & 0 & 0 & 0 & 0 \\ h_1 & h_0 & 0 & \ldots & 0 & 0 & 0 & 0 & 0 \\ h_2 & h_1 & h_0 & 0 & \ldots & 0 & 0 & 0 & 0 \\ \vdots & & & & & \vdots & & & \vdots \\ 0 & \ldots & 0 & 0 & 0 & h_{L-1} & \ldots & h_1 & h_0 \end{bmatrix}$$

$$H_{ISI\_i} = \begin{bmatrix} 0 & \ldots & 0 & h_{L-1} & \ldots & h_2 & h_1 \\ 0 & 0 & \ldots & 0 & h_{L-1} & \ldots & h_2 \\ 0 & 0 & 0 & \ldots & 0 & \ddots & \vdots \\ 0 & 0 & 0 & 0 & \ldots & 0 & h_{L-1} \\ 0 & 0 & 0 & 0 & 0 & \ldots & 0 \\ \vdots & & & \vdots & & & \vdots \\ 0 & 0 & 0 & 0 & 0 & \ldots & 0 \end{bmatrix}$$

$$n_i = [n_i(0)\ n_i(1)\ \ldots\ n_i(K-1)]^T$$

What is proposed instead is to utilize compact parameterization of wavelets to pre-equalize the channel. In other words, if there is an estimate of a set of parameters for a given filter bank matrix $F_N$ which maximizes received signal quality, then this information can be used to modify the modulation matrix $T_K$. If it is assumed that there is sufficient training data to form a channel estimate at the receiver $\hat{h}_i$, then the best wavelet parameterization set may be found utilizing additional training data and the K-by-K channel estimation matrix:

$$\hat{H}_i = \begin{bmatrix} \hat{h}_0 & 0 & \cdots & 0 & 0 & 0 & 0 & 0 & 0 \\ \hat{h}_1 & \hat{h}_0 & 0 & \cdots & 0 & 0 & 0 & 0 & 0 \\ \hat{h}_2 & \hat{h}_1 & \hat{h}_0 & 0 & \cdots & 0 & 0 & 0 & 0 \\ \vdots & & & & \vdots & & & & \vdots \\ 0 & \cdots & 0 & 0 & 0 & \hat{h}_{L-1} & \cdots & \hat{h}_1 & \hat{h}_0 \end{bmatrix} \quad (17)$$

Clearly, applying a unitary transformation will not reduce the power of additive Gaussian noise; however, a unitary transformation such as a DWT could be applied to minimize the two sources of interference seen in frequency selective channels by multicarrier systems, namely ICI and ISI. Using this channel estimation matrix, the optimal wavelet parameterization set which minimizes ICI for a given P can be found as $$\min_{\{\alpha_r\} \in \mathcal{R}^N} \left\| T_K^T(P, \{\alpha_r\}) \hat{H}_i T_K(P, \{\alpha_r\}) - I_K \right\| \quad (18)$$

Additional criteria could be established to minimize ISI. This would involve selection of a wavelet transform that would render ISI contributions from any given wavelet symbol to the ensuing wavelet symbol negligible. Based on the ISI contributions evident in (15), we define the K-by-K channel matrix:

$$\hat{H}_{ISI\_i} = \begin{bmatrix} 0 & \cdots & 0 & \hat{h}_{L-1} & \cdots & \hat{h}_2 & \hat{h}_1 \\ 0 & 0 & \cdots & 0 & \hat{h}_{L-1} & \cdots & \hat{h}_2 \\ 0 & 0 & 0 & \cdots & 0 & \ddots & \vdots \\ 0 & 0 & 0 & 0 & \cdots & 0 & \hat{h}_{L-1} \\ 0 & 0 & 0 & 0 & 0 & \cdots & 0 \\ \vdots & & & & & & \vdots \\ 0 & 0 & 0 & 0 & 0 & \cdots & 0 \end{bmatrix} \quad (19)$$

Thus, another optimization criterion that minimizes ISI may be considered:

$$\min_{\{\alpha_r\} \in \mathcal{R}^N} \left\| T_K^T(P, \{\alpha_r\}) \hat{H}_{ISI\_i} T_K(P, \{\alpha_r\}) \right\| \quad (20)$$

In addition to selection of a wavelet that minimizes ICI and ISI, the wavelet itself cannot be considered to have approximately equalized the channel unless the energy along the resultant diagonal is maximized. This results directly in maximizing received signal energy. The criterion that maximizes the energy along the diagonal (assuming $\Lambda$ is a diagonal operator) is:

$$\min_{\{\alpha_r\} \in \mathcal{R}^N} \frac{1}{\left\| \Lambda(T_K^T(P, \{\alpha_r\}) \hat{H}_i T_K(P, \{\alpha_r\})) \right\|} \quad (21)$$

It cannot be assumed that a single parameter set will minimize ISI and ICI while maximizing recovered channel energy. Thus, the wavelet parameter selection should be based on a criterion that minimizes all of the residual interference:

$$\min_{\{\alpha_r\} \in \mathcal{R}^N} \left\| T_K^T(P, \{\alpha_r\}) \hat{H}_i T_K(P, \{\alpha_r\}) - \hat{h}_0 I_K \right\| + \left\| T_K^T(P, \{\alpha_r\}) \hat{H}_{ISI\_i} T_K(P, \{\alpha_r\}) \right\| + \frac{1}{\left\| \Lambda(T_K^T(P, \{\alpha_r\}) \hat{H}_i T_K(P, \{\alpha_r\})) \right\|} \quad (22)$$

Figure 2:
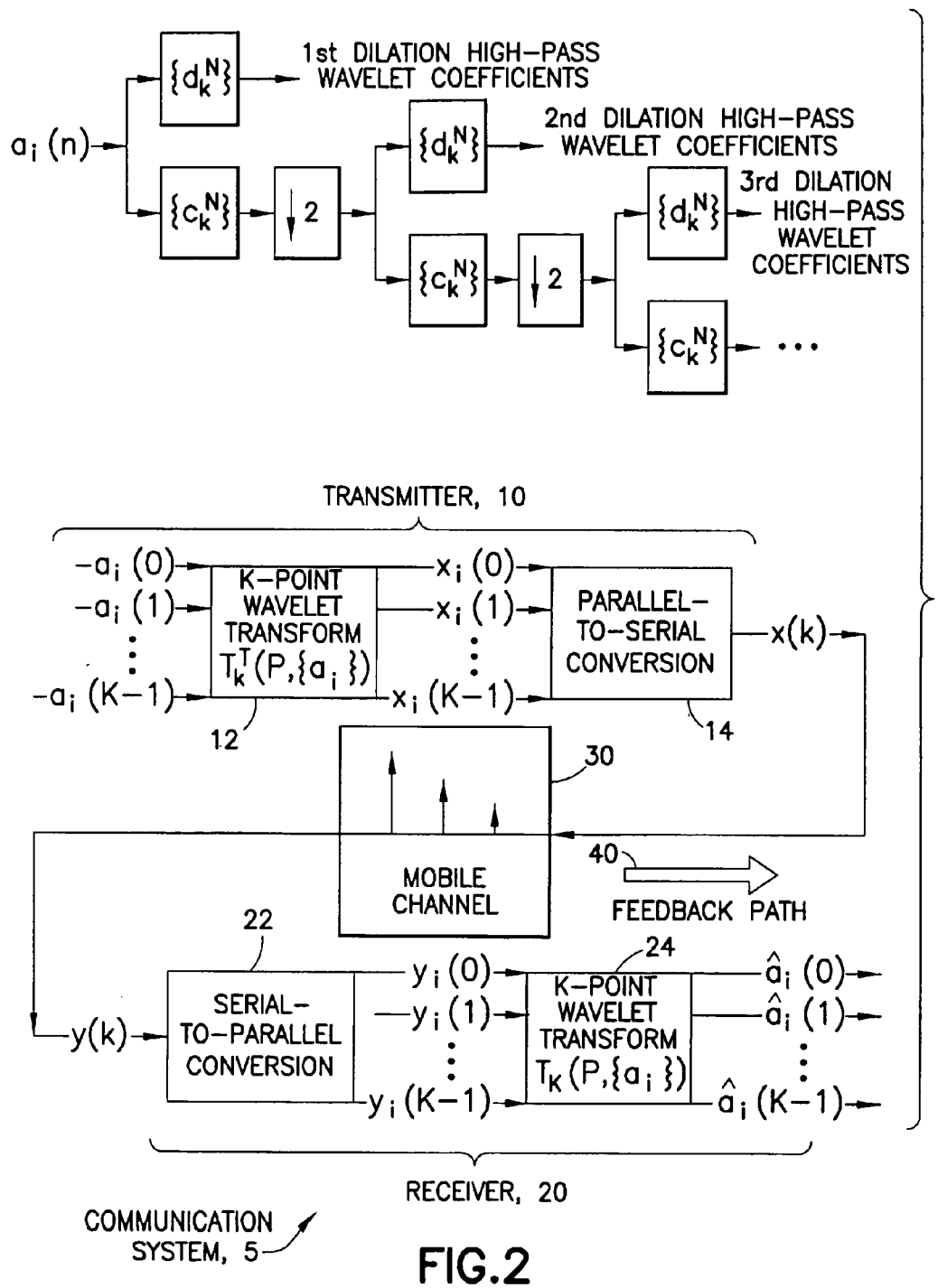
FIG. 2 shows a block diagram of a wavelet transmission system.

Finally, the wavelet transmission method is as depicted in FIG. 2.

More specifically, FIG. 2 shows a communications system 5 having a transmitter 10, which may be a base station, and a receiver 20 that communicate through a wireless (mobile) channel 30. The transmitter 10 includes a k-point wavelet transform block 12 and a serial-to-parallel conversion block 14, an output of which is coupled to the channel 30. The receiver 20 includes a serial-to-parallel conversion block 22 having an input coupled to the channel 30, and an output coupled to a k-point wavelet transform block 24. A feedback channel or path 40 is provided between the receiver 20 and the transmitter 10 via the channel 30.

Summarizing, the process according to the invention is:

Starting with an estimated channel matrix, and an initial parameter set alpha that specifies an initial wavelet (assuming P is fixed).

Send training signals from the transmitter (base station) 10 to the receiver 20.

In the receiver 20 iterate (or otherwise compute) the value of adjusted wavelet parameters that minimize the ICI, the ISI and the total residual interference.

Send the adjusted parameters back along the feedback path 40 to the transmitter 10.

Use the adjusted parameters in transmission for the next period until the next adjustment.

It should be noted that there could still be residual interference even after wavelet selection. This would result from effects such as feedback latency with respect to the coherence time of the channel, reduced parameter search space, etc. As a result, some limited form of interference cancellation may still be necessary even when the wavelet is best matched to channel conditions. Moreover, using the metric in (22) does not maximize diversity seen in the system; it only optimizes ICI and ISI.

The design of parameterized wavelets poses a classic problem in adaptive waveform design for wireless transmission in a system where the receiver must convey information on the channel conditions to the transmitter: how to minimize the throughput required for relaying the necessary information from the receiver to the transmitter for accurate waveform selection. This is normally not a problem in time division duplexed (TDD) systems, as it is generally assumed that a TDD transmitter can estimate channel conditions seen at the TDD receiver without feedback. However, paired-band systems generally do not have sufficient correlation between transmit and receive frequencies used by a given transceiver. Thus minimizing the amount of information to be relayed by the receiver to the transmitter for waveform selection is critical.

However, the wavelet filter bank matrix selectivity clearly improves with increasing order 2N. This requires greater parameterization, thus potentially increasing the required feedback information. Thus given a maximum feedback data payload R (bits), there exists a tradeoff between increasing the filter bank selectivity and reducing the quantization noise of the feedback parameters. If we assume that each value in the parameter set $\{\alpha_i\}$ is uniformly quantized between 0 and $\pi$, we can find the mean quantization error as $$\sigma_q^2 = \frac{1}{12}\left(\frac{\pi}{2^{\lfloor \frac{R}{N} \rfloor}}\right)^2 \quad (23)$$

Figure 3:
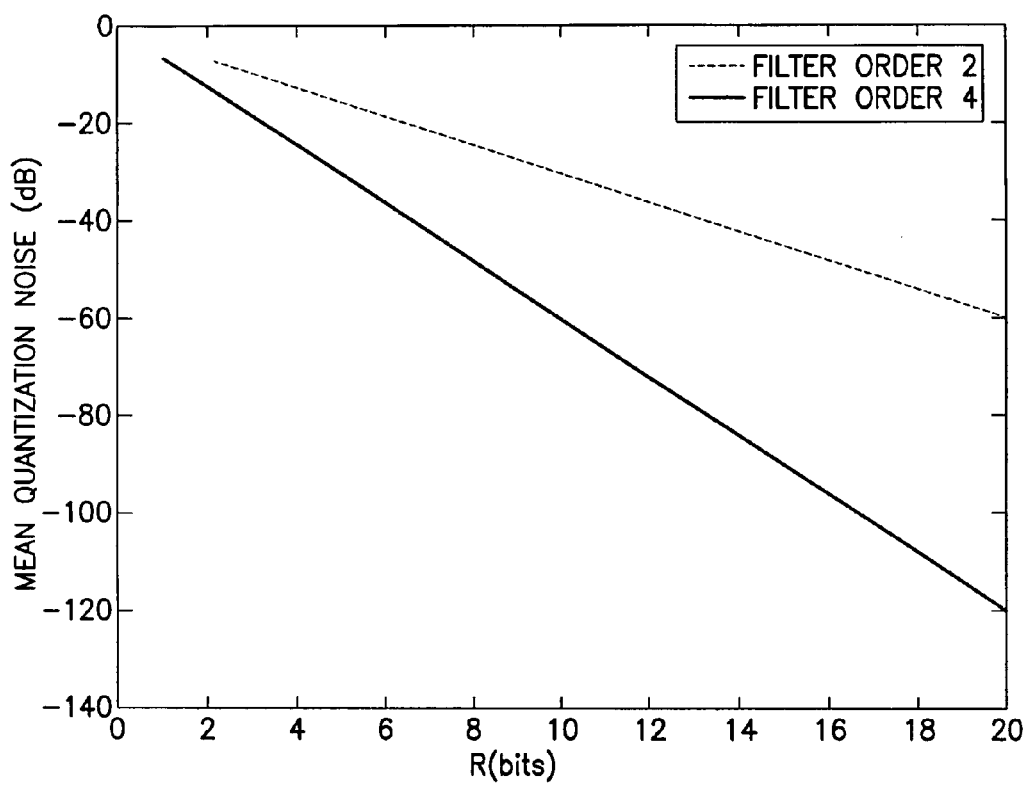
FIG. 3 shows quantization noise characteristics

In equation (23), the quantization error is derived from the classic result on uniform quantization of a uniformly distributed random variable. Unfortunately, this error variance in and of itself may not give sufficient insight into the degradation of a wavelet-based communications system due to throughput limitations for feedback of wavelet parameter selection. However, it could provide an indication of the optimal filter bank order given specific feedback limitations. The quantization noise for filter orders of 2 and 4 is depicted in FIG. 3. In the left region of the curve, quantization noise increases to unacceptable levels with increasing filter order. However, in the right region of the curve, quantization noise tends to drop below unacceptable levels with increasing filter order (although quantization noise still worsens with increasing filter order for any given value of R). This is not surprising, as it stands to reason that increasing throughput payloads will allow for more accurate quantization of an increasing number of wavelet parameters, ergo allowing for higher-order filterbanks.

A relevant question is what constitutes an "unacceptable level" of quantization noise, as it would stand to reason that for a given value of R, the filter order that should be selected is the maximum one which falls below this level.

FIG. 2 illustrates the process of forming the coefficients that produce a given wavelet. A set of signal coefficients $a_i$ representing the speech or other data are input on the left and are processed (e.g. by a general purpose computer system) to generate the final coefficients that define the particular wavelets used in the transmitter 10.

In operation, in the system 5 according to the invention, the transmitter 10 periodically sends a reference signal (a training sequence) to the receiver 20. The receiver 20 applies known algorithms to the received signal to estimate the channel matrix. The receiver 20 then transforms the channel matrix using various trial parameters and selects the parameters that give the result that best fits a criterion such as that expressed in Equation 22 that minimizes ICI and ISI.

The "best fit" parameters are relayed to the transmitter 10 along the feedback channel 40 having a limited number of bits.

The transmitter 10 then prepares packets using the parameters sent to it by the receiver 20 for the duration of the period.

Figure 12:
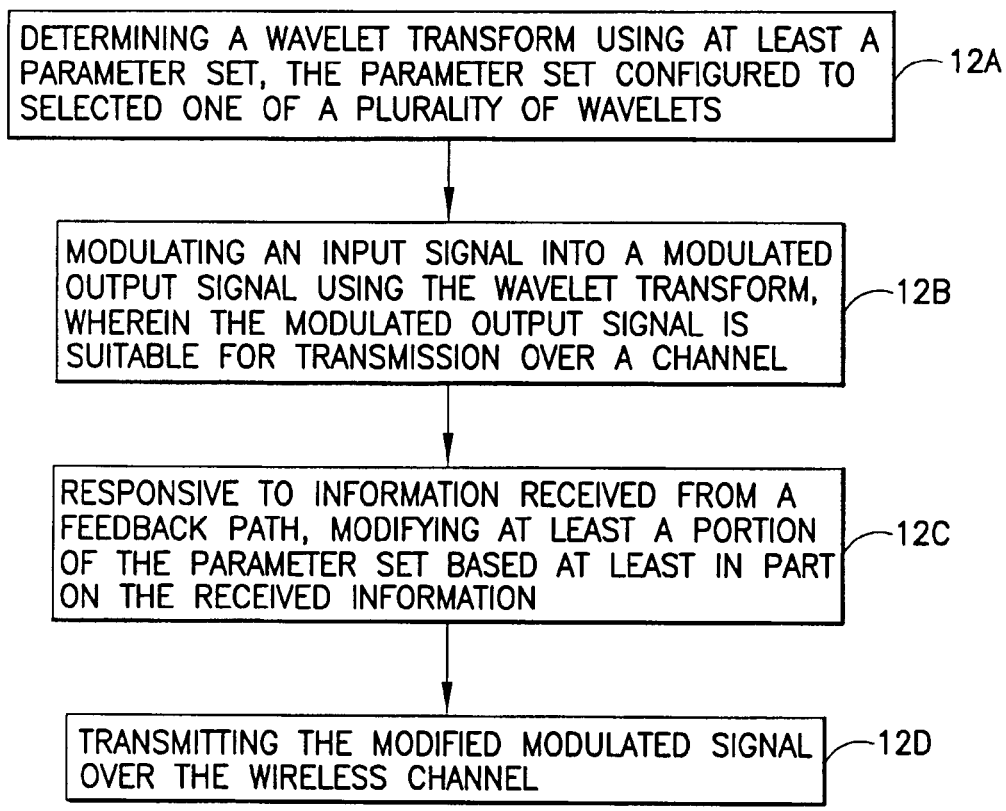
FIG. 12 is a logic flow diagram that illustrates a method, and the operation of a memory medium, in accordance with the exemplary embodiments of this invention.

Reference is made to FIG. 12 for showing a logic flow diagram that illustrates a method, and the operation of a memory medium, in accordance with the exemplary embodiments of this invention. At Block 12A there is an operation of determining a wavelet transform using at least a parameter set, the parameter set configured to select one of a plurality of wavelets. At Block 12B there is performed an operation of modulating an input signal into a modulated output signal using the wavelet transform, wherein the modulated output signal is suitable for transmission over a wireless channel. At Block 12C there is performed an operation of, responsive to information received from the feedback path 40, modifying at least a portion of the parameter set based at least in part on the received information. At Block 12D, the modified modulated signal is transmitted over the wireless channel.

Figure 4:
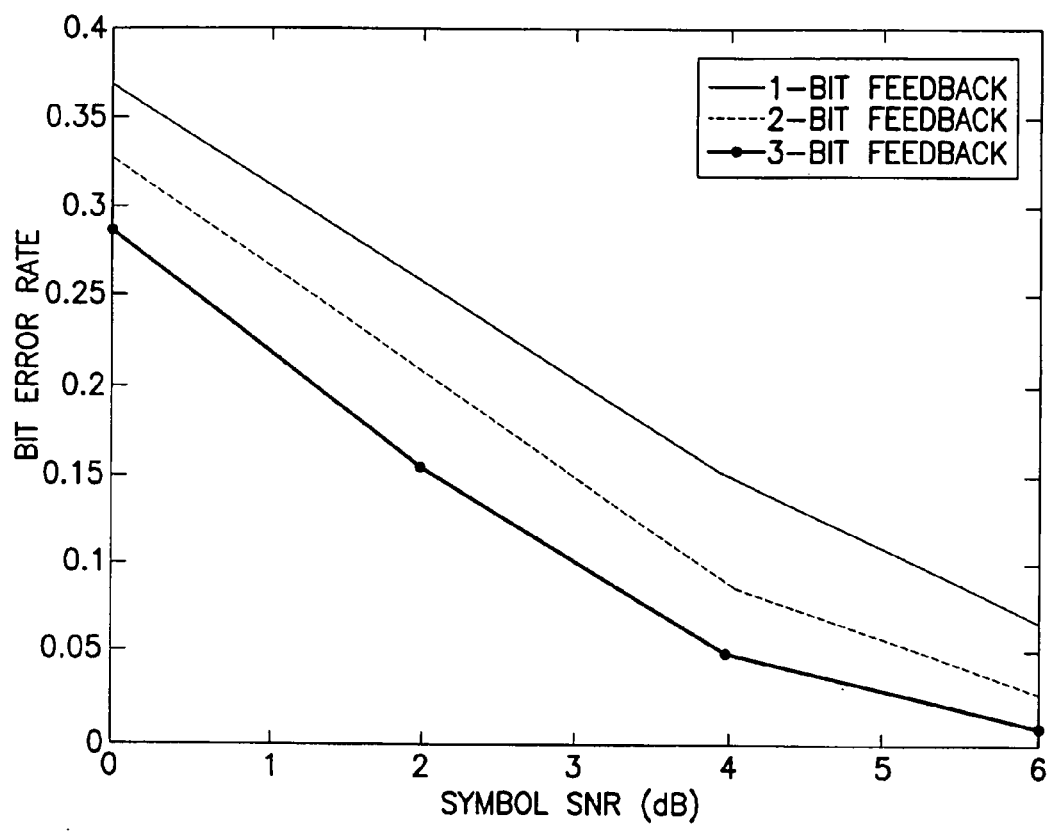
FIG. 4 shows feedback effects in a 2-tap wavelet system.
Figure 5:
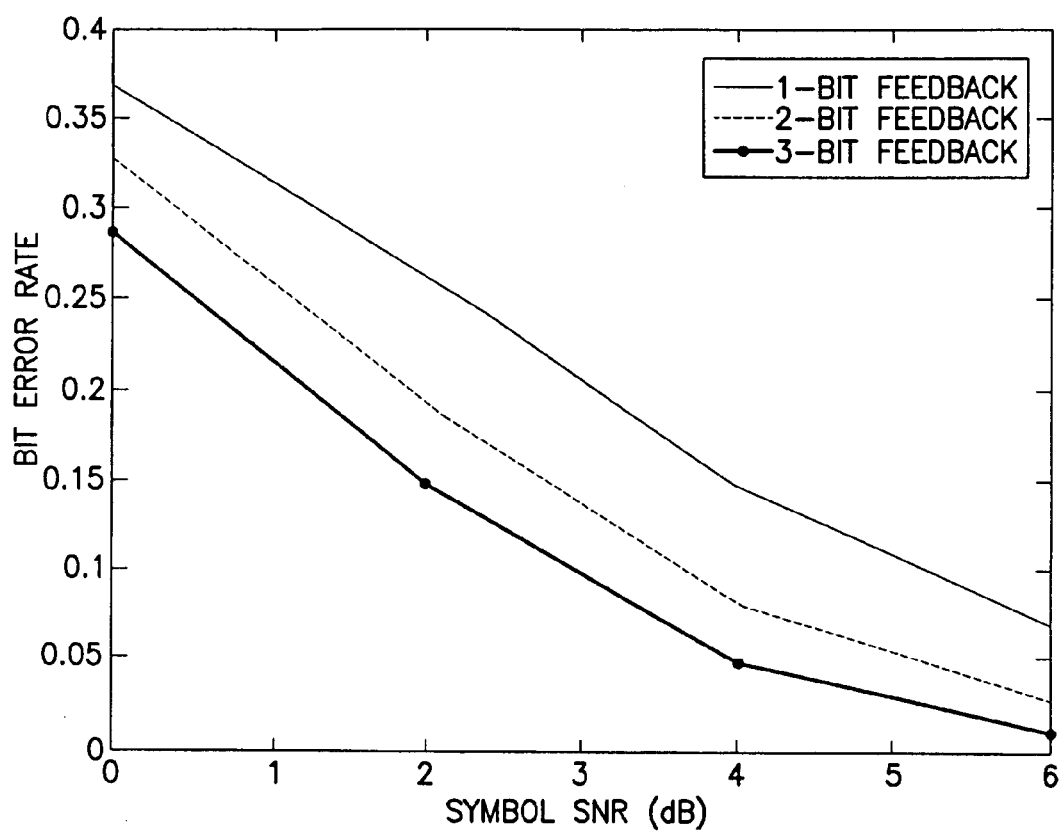
FIG. 5 shows feedback effects in a 4-tap wavelet system.

A test over a specific channel profile was conducted for several different types of wavelet decompositions to examine the feasibility of adapting the wavelet to the instantaneous channel conditions based on their parameterization. Assuming an input vector of dimension 32 modulated by a square wavelet transformation matrix, a transmission system was tested at a wavelet symbol rate of 250 kHz (symbol rate in this case refers to the rate at which all 32 wavelet coefficients resulting from a single input vector was transmitted). The two-tap and four-tap wavelet models of (9) and (10) were examined for performance of BPSK signaling in a multipath fading channel (channel tap power profile of [0.8 0.1 0.1]) at an assumed carrier frequency of 5 GHz and velocity of 3 km/hr. In the system modeling, the wavelet parameter was selected every 50 symbols. Under these conditions, the performance of the 2-tap and 4-tap wavelets with respect to feedback quantization is given in FIG. 4 and FIG. 5, respectively.

Under these conditions, the benefits of increasing feedback naturally become less prevalent as the number of bits increases. In this environment, although increasing feedback would yield 6 dB of quantization noise relief, this clearly does not translate to the same benefits in terms of overall performance. It should also be noted that the results are graphed in terms of raw BPSK bit error rate; an additional error correcting code could translate to less benefits for increasing the number of feedback bits. Another thing to notice is that the performance of the 2-tap and 4-tap wavelet systems was roughly the same.

Figure 6:
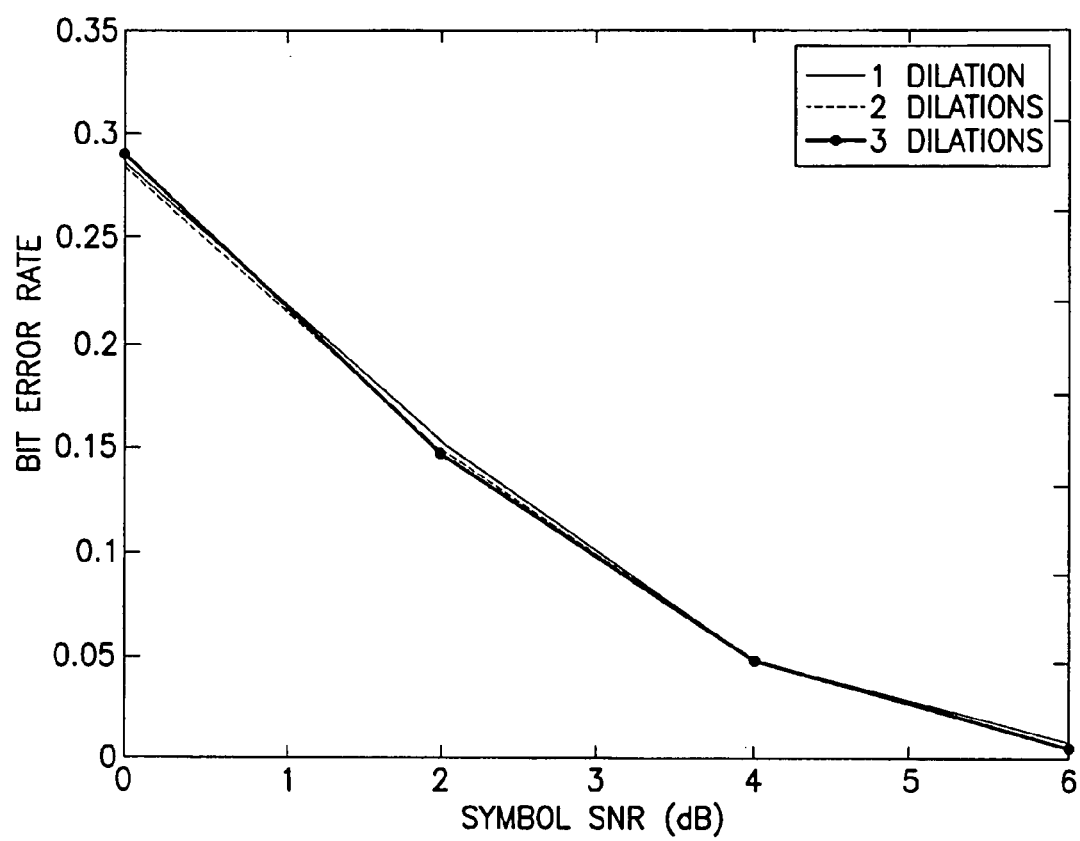
FIG. 6 shows dilation effects in a 2-tap wavelet system.
Figure 7:
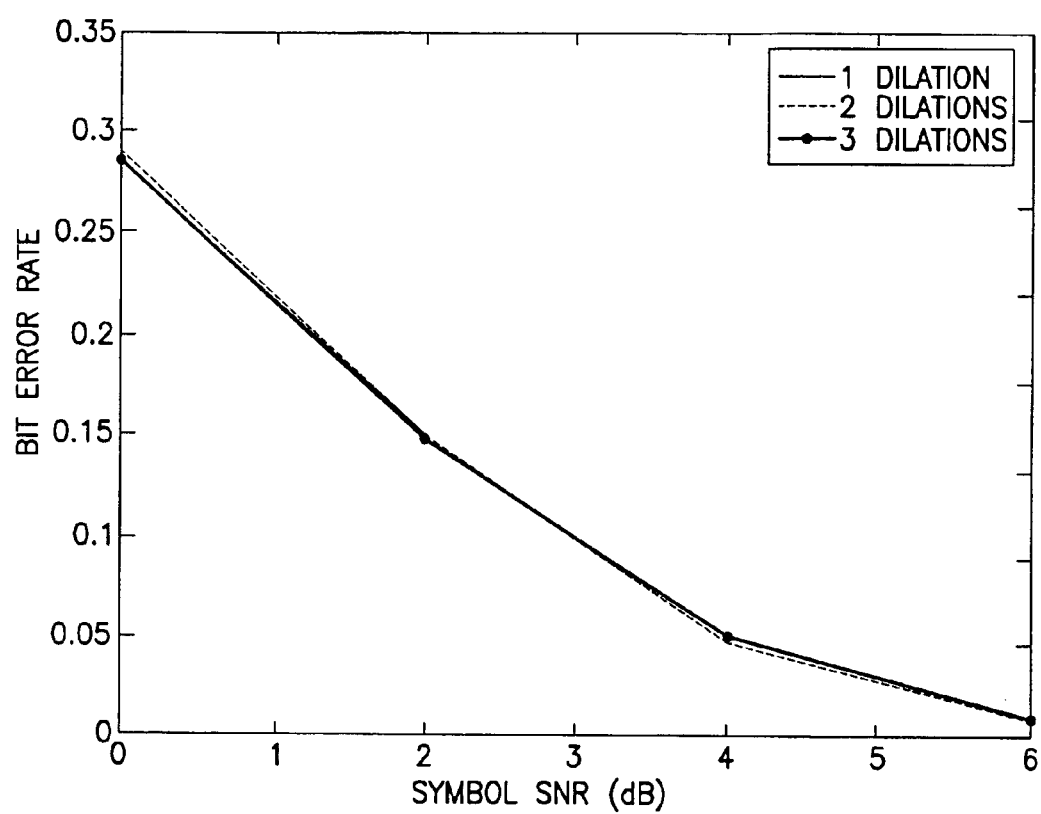
FIG. 7 shows dilation effects in a 4-tap wavelet system.

In addition, the number of dilations could possibly impact the performance of the proposed method of wavelet transmission. Once again, the results for both the 2-tap and 4-tap wavelets assuming 3-bit feedback quantization are provided in FIG. 6 and FIG. 7, respectively. Increasing the number of dilations did not provide much benefit in improving performance of the system. This could most likely be because of the fact that the channel conditions under consideration are already fairly compact in frequency and in time; the greatest performance enhancement of this method is to change the fundamental wavelet filterbank rather than changing the time-frequency decomposition of the transmitted signal.

Figure 8:
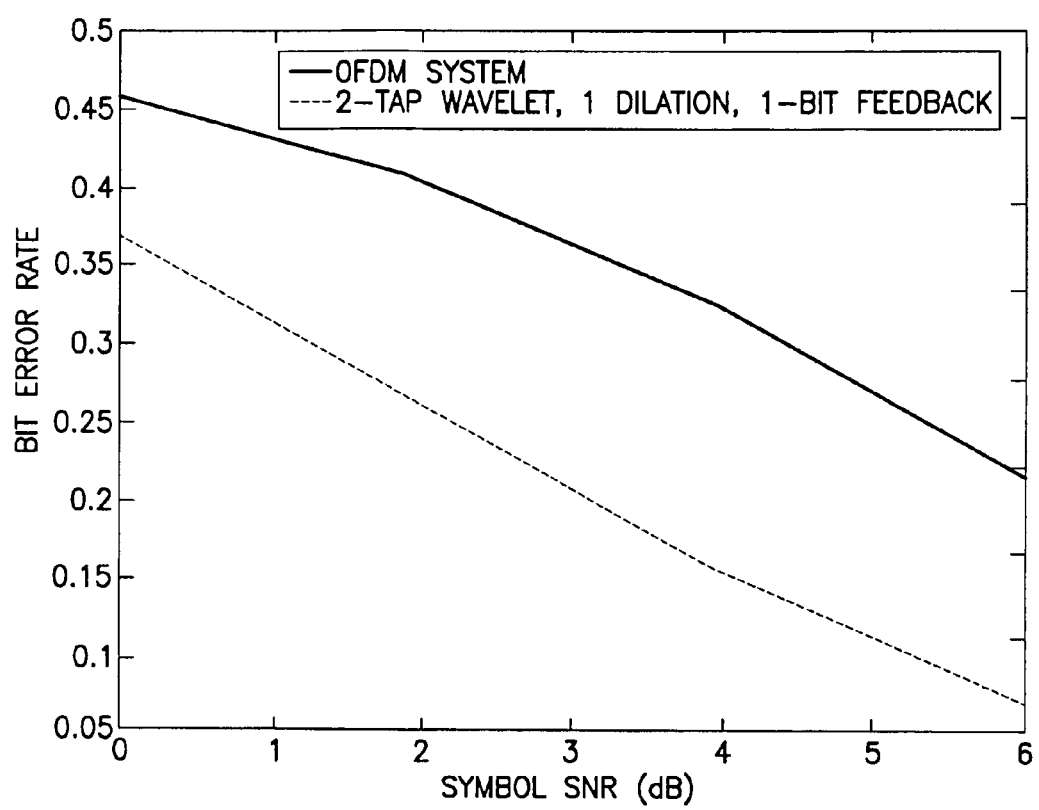
FIG. 8 compares BER between a wavelet and an OFDM system.

To better appreciate the maximum achievable benefits of multiscale communications, an OFDM system was simulated using identical channel conditions and identical input vector size. A comparison to the 2-tap wavelet with and one bit of feedback is given in FIG. 8. The performance enhancements due to wavelet modulation are seen to be as much as 3 dB. Taking into account that the OFDM system is transmitted in quadrature while the wavelet system does not require quadrature transmission for BPSK signaling, it is clear that the spectral efficiency of the wavelet system is potentially much higher than the OFDM system.

Figure 9:
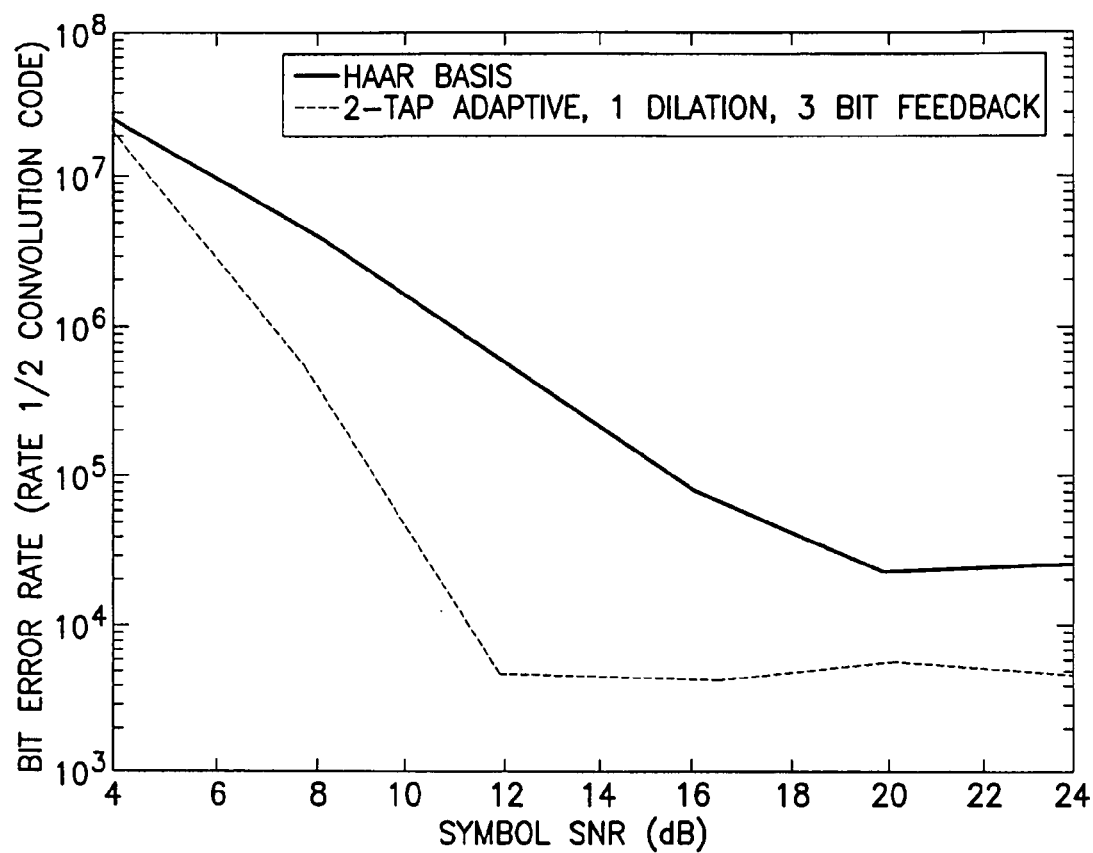
FIG. 9 compares BER in fixed versus adaptive wavelet systems, 2-tap.
Figure 10:
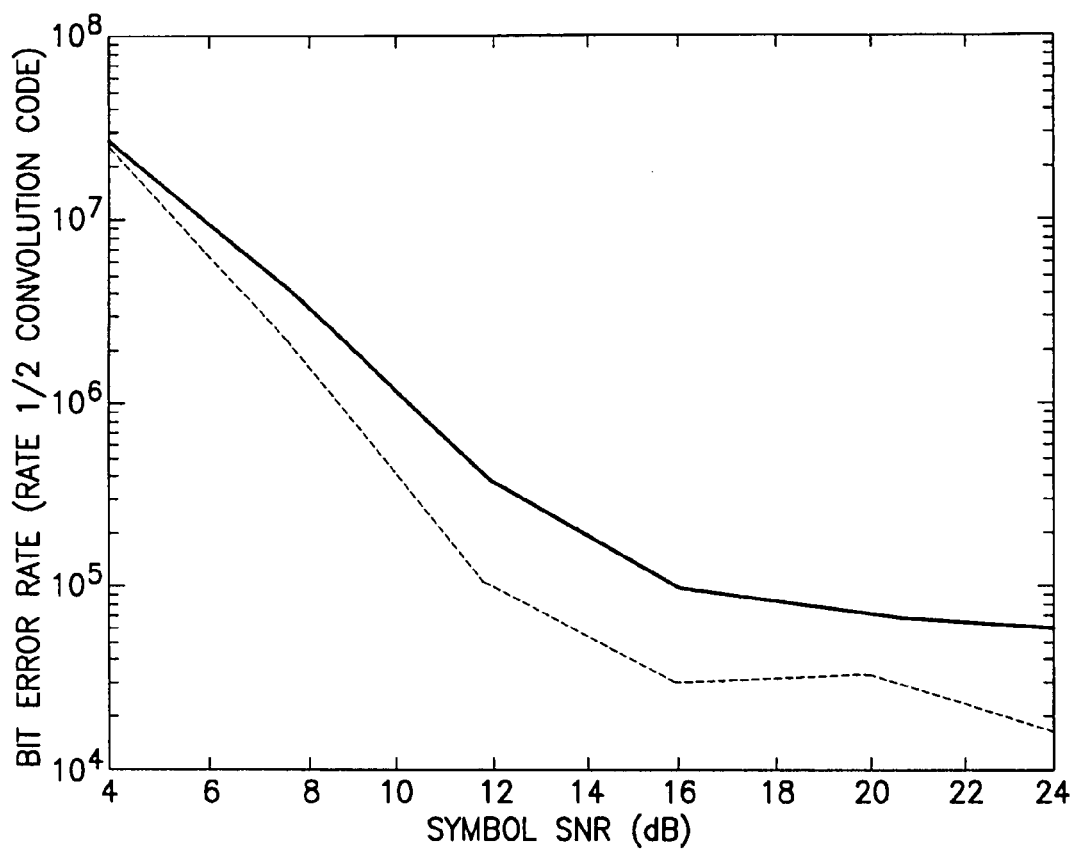
FIG. 10 compares BER in fixed verses adaptive wavelet systems, 4-tap.

Some more results were obtained for the adaptive method in fading channels and compared to the use of a fixed method (in this case, the Haar basis and Daubechies 4-tap). Using a channel tap profile of [0.8 0.2] along with a symbol rate of 125 kHz and an input vector size of 64, the fixed and adaptive methods were compared under fading conditions with a carrier frequency of 5 GHz and a velocity of 150 km/hr. A rate ½ convolutional code was used, meaning that an input segment of 32 bits was coded into an input vector of 64 binary symbols (BPSK signaling). The results are shown in FIG. 9 and FIG. 10.

Both of the methods seem to converge at low SNR. This is due to AWGN being the overriding source of error in this operating region; no adaptation can enhance the link under such conditions. In addition, note that both methods do result in an error floor. For the fixed case, this is due to a suboptimal wavelet being used for transmission. In the adaptive case, this is due in part to the use of limited feedback. However, even assuming infinitely precise quantization of the parameterization space, it should still be re-asserted that the selected wavelet will be an approximation of the equalizing transform.

Figure 11:
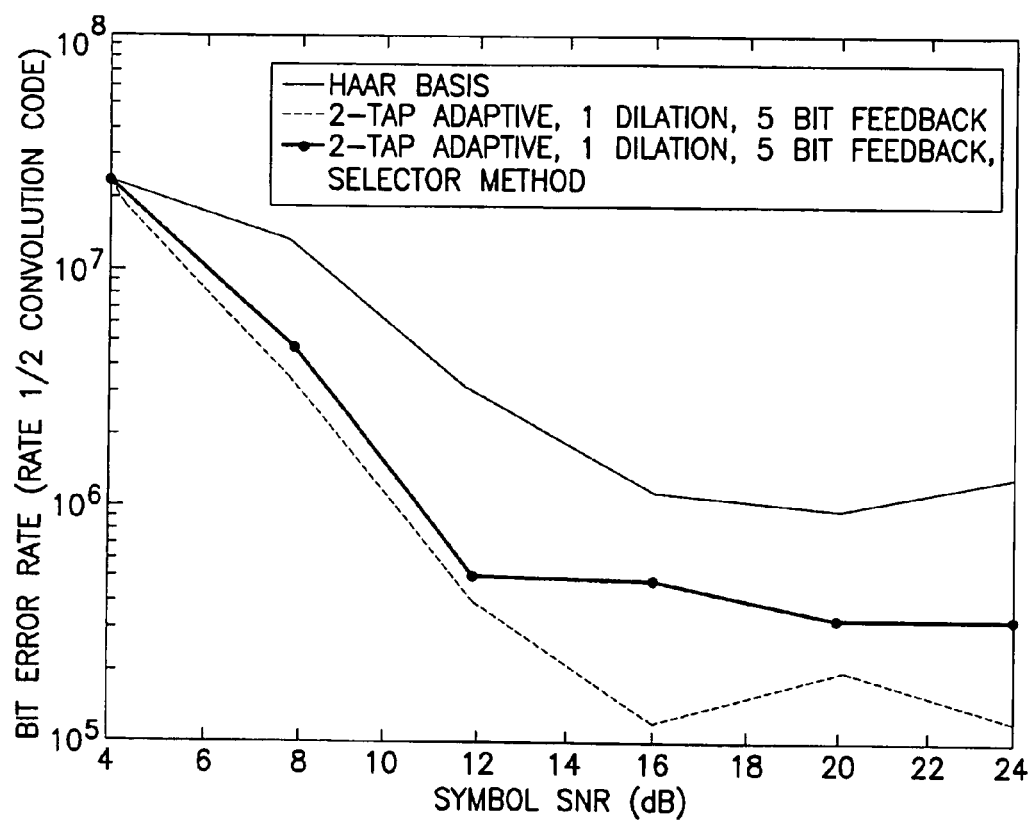
FIG. 11 shows BER in various systems.

The wavelet selection method given above, particularly the criterion presented in Equation (22), was examined versus the fixed method in the static channel profile of [0.5 0.3 0.1 0.1]. In this case, the feedback quantization was increased to 5 bits so as to more accurately examine whether the wavelet selection actually selects the best wavelet. More specifically, under the assumptions of coarse quantization, the likelihood of picking the correct wavelet using the wavelet selection method increases; therefore the accuracy of this method is not so easy to assess under such conditions. The results for the 2-tap method are given in FIG. 11. Note that the wavelet selection method retained the gains of the adaptive method versus the use of a fixed wavelet. Note also that the error floor is still present, although at a bit error rate between $10^{-4}$ and $10^{-3}$.

In one embodiment, an article of manufacture comprises a program storage medium readable by a computer, i.e., a computer readable storage medium that embodies instructions executable by the computer for performing method steps of operating a telecommunications system comprising receiving an input vector signal and modulating said input signal in controllable variable transformation means with a transform having a compact parameter representation with P dilations. In this embodiment, a parameter set is provided and said transform has a parallel output set of data where the parallel set of data is converted to a serial set of data; the serial set of data is transmitted along a channel; the serial set of data is received; the received serial data is converted to parallel data; and the parallel data is demodulated in accordance with the compact parameter representation.

Although the invention has been described with respect to a limited number of embodiments, those skilled in the art will appreciate that other embodiments may be constructed within the spirit and scope of the following claims.

What is claimed is:

1. An apparatus comprising:
a modulator configured to determine a wavelet transform using at least a parameter set, the parameter set configured to select one of a plurality of wavelets, the modulator configured to modulate an input signal into a modulated output signal using the wavelet transform, wherein the modulated output signal is suitable for transmission over a wireless channel, the modulator configured to receive at least a portion of the parameter set used to transform an estimated channel matrix based at least in part on information received from a feedback path, wherein the information corresponds to quantized values of parameters in the at least the portion of the parameter set, the modulator further configured to determine a training sequence for a receiver to form the estimated channel matrix; and
a transmitter configured to transmit the modulated output signal and the training sequence over the wireless channel.

2. An apparatus according to claim 1, wherein the wavelet transform has a representation corresponding to P dilations, where P is an integer that specifies a number of dilations desired in the wavelet transform.

3. An apparatus according to claim 1, wherein the wavelet transform comprises a K-point wavelet transform determined at least in part using at least a modified portion of the parameter set, where K is an integer.

4. An apparatus according to claim 1, wherein the modulated output signal comprises a parallel set of data, and wherein the output portion further comprises:
a parallel to serial converter configured to convert the parallel set of data to a serial set of data suitable for transmission to the wireless channel.

5. An apparatus according to claim 1, wherein the modulator is further configured to multiply a vector representing input data corresponding to the input signal with the estimated channel matrix representing the wavelet transform.

6. An apparatus according to claim 1, wherein the modulator is further configured to modulate, in a first period, an input signal comprising test data using a wavelet transform determined using at least an original parameter set and is further configured to modulate, in a second period, an input signal comprising other data using a wavelet transform determined using at least a modified version of the original parameter set, the modified version of the original parameter set determined by modifying at least a portion of the original parameter set based at least in part on the received information.

7. A method comprising:
determining, by a computer, a wavelet transform using at least a parameter set, the parameter set configured to select one of a plurality of wavelets;
modulating an input signal into a modulated output signal using the wavelet transform, wherein the modulated output signal is suitable for transmission over a wireless channel;
receiving at least a portion of the parameter set used to transform an estimated channel matrix based at least in part on information received from a feedback path, wherein the information corresponds to quantized values of parameters in the at least the portion of the parameter set;
determining a training sequence for a receiver to form the estimated channel matrix; and
transmitting, by a transmitter, the modulated output signal and the training sequence over the wireless channel.

8. A method according to claim 7, wherein the wavelet transform has a representation corresponding to P dilations, where P is an integer that specifies a number of dilations desired in the wavelet transform.

9. A method according to claim 7, wherein the modulated output signal comprises a parallel set of data, and wherein the method further comprises:
receiving the input signal; and
converting the modulated output signal from the parallel set of data to a serial set of data suitable for transmission over the channel.

10. A method according to claim 9, further comprising transmitting the serial set of data over the channel.

11. A method according to claim 7, wherein modulating further comprises multiplying a vector representing input data corresponding to the input signal with a matrix representing the wavelet transform.

12. A method comprising:
determining, by a computer, a wavelet transform using at least a parameter set, the parameter set configured to select one of a plurality of wavelets;

modulating an input signal into a modulated output signal using the wavelet transform, wherein the modulated output signal is suitable for transmission over a wireless channel;

receiving at least a portion of the parameter set used to transform an estimated channel matrix based at least in part on information received from a feedback path, wherein the information corresponds to quantized values of parameters in the at least the portion of the parameter set;

determining a training sequence for a receiver to form the estimated channel matrix; and transmitting, by a transmitter, the modulated output signal and the training sequence over the wireless channel, wherein the wavelet transform comprises a K-point wavelet transform determined at least in part using at least a modified portion of the parameter set, where K is an integer.

13. A method comprising:

determining, by a computer, a wavelet transform using at least an original parameter set;

modulating an input signal comprising test data into a first modulated output signal using the wavelet transform wherein the first modulated output signal is suitable for transmission over a wireless channel;

receiving at least a portion of the original parameter set used to transform an estimated channel matrix based at least in part on information received from a feedback path, wherein the information corresponds to quantized values of parameters in the at least the portion of the parameter set;

determining a training sequence for a receiver to form the estimated channel matrix;

transmitting the training sequence to the receiver to form the estimated channel matrix;

determining a wavelet transform using at least a modified original parameter set, the modified original parameter set configured to select one of a plurality of wavelets;

modulating an input signal comprising other data into a second modulated output signal using a wavelet transform determined using at least the modified original parameter set, wherein the second modulated output signal is suitable for transmission over the wireless channel; and transmitting, by a transmitter, the second modulated output signal over the wireless channel.

14. A computer readable storing medium embodied with a computer program whose instructions, when executed by a computer, cause the computer to perform operations comprising:

determining, by a computer, a wavelet transform using at least a parameter set, the parameter set configured to select one of a plurality of wavelets;

modulating an input signal into a modulated output signal using the wavelet transform, wherein the modulated output signal is suitable for transmission over a wireless channel;

receiving, by a modulator, at least a portion of the parameter set used to transform an estimated channel matrix based at least in part on information received from a feedback path, wherein the information corresponds to quantized values of parameters in the at least the portion of the parameter set;

determining a training sequence for a receiver to form the estimated channel matrix; and commanding transmission by a transmitter of the training sequence and the modulated output signal over the wireless channel, wherein the wavelet transform comprises a K-point wavelet transform determined at least in part using a modified parameter set, where K is an integer.

15. A memory medium readable by a computer, the medium embodying instructions, when executed, cause the computer to perform operations comprising:

determining, by a computer, a wavelet transform using at least a parameter set, the parameter set configured to select one of a plurality of wavelets;

modulating an input signal into a modulated output signal using the wavelet transform, wherein the modulated output signal is suitable for transmission over a wireless channel;

receiving at least a portion of the parameter set used to transform an estimated channel matrix based at least in part on information received from a feedback path, wherein the information corresponds to quantized values of parameters in the at least the portion of the parameter set;

determining a training sequence for a receiver to form the estimated channel matrix; and commanding transmission, by a transmitter, of the training sequence and the modulated output signal over the wireless channel.

16. A method comprising:

determining, by a computer, a wavelet transform using at least a parameter set, the parameter set configured to select one of a plurality of wavelets;

modulating an input signal into a modulated output signal using the wavelet transform, wherein the modulated output signal is suitable for transmission over a wireless channel; and receiving at least a portion of the parameter set used to transform an estimated channel matrix based at least in part on information received from a feedback path, wherein the information corresponds to quantized values of parameters in the at least the portion of the parameter set, wherein the wavelet transform comprises a K-point wavelet transform determined at least in part using at least a modified portion of the parameter set, where K is an integer;

determining a training sequence for a receiver to form the estimated channel matrix; and transmitting, by a transmitter, the modulated output signal and the training sequence over the wireless channel.

17. A method comprising:

determining, by a computer, a wavelet transform using at least a parameter set, the parameter set configured to select one of a plurality of wavelets;

modulating an input signal into a modulated output signal using the wavelet transform, wherein the modulated output signal is suitable for transmission over a wireless channel; and receiving at least a portion of the parameter set used to transform an estimated channel matrix based at least in part on information received from a feedback path, wherein the information corresponds to quantized values of parameters in the at least the portion of the parameter set, wherein the information corresponds to quantized values of parameters in the at least the portion of the parameter set;

determining a training sequence for a receiver to form the estimated channel matrix; and transmitting, by a transmitter, the modulated output signal and the training sequence over the wireless channel.

18. An apparatus comprising:
a modulator configured to determine a wavelet transform using at least a parameter set, the parameter set configured to select one of a plurality of wavelets; configured to modulate an input signal into a modulated output signal using the wavelet transform, wherein the modulated output signal is suitable for transmission over a wireless channel; and, responsive to information received from a feedback path, the modulator configured to receive at least a portion of the parameter set used to transform an estimated channel matrix based at least in part on the received information, wherein the wavelet transform comprises a K-point wavelet transform determined at least in part using at least a modified portion of the parameter set, where K is an integer, wherein the modulator is further configured to determine a training sequence for a receiver to form the estimated channel matrix, and a transmitter configured to transmit the modulated output signal and the training sequence over a wireless channel.

* * * * *

UNITED STATES PATENT AND TRADEMARK OFFICE
CERTIFICATE OF CORRECTION

PATENT NO. : 7,680,208 B2  
APPLICATION NO. : 10/788188  
DATED : March 16, 2010  
INVENTOR(S) : Mandyam Page 1 of 1

It is certified that error appears in the above-identified patent and that said Letters Patent is hereby corrected as shown below:

Claim 16, col. 14, line 46 delete "and the training sequence".
Claim 18, col. 16, line 9 delete "and the training sequence".

Signed and Sealed this

Eighteenth Day of May, 2010

David J. Kappos
*Director of the United States Patent and Trademark Office*